(12) United States Patent
Takagi et al.

(10) Patent No.: US 7,572,375 B2
(45) Date of Patent: Aug. 11, 2009

(54) METHOD AND DEVICE FOR TREATING FINE PARTICLES

(75) Inventors: Seiichi Takagi, Minamiashigara (JP); Kazuya Hongo, Minamiashigara (JP); Hiroshi Miyamoto, Minamiashigara (JP); Tetsuo Ohta, Minamiashigara (JP); Kazuki Inami, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 391 days.

(21) Appl. No.: 10/929,677

(22) Filed: Aug. 31, 2004

(65) Prior Publication Data

US 2005/0178727 A1  Aug. 18, 2005

(30) Foreign Application Priority Data

Feb. 16, 2004  (JP)  ............................. 2004-038825

(51) Int. Cl.
*B01D 11/00* (2006.01)

(52) U.S. Cl. .................. 210/634; 209/155; 209/208; 430/112; 430/137.1

(58) Field of Classification Search .................. 210/511, 210/634, 639, 748, 149, 175, 742, 774; 209/1, 209/155, 11, 18, 156, 208, 210, 457; 422/101; 436/177, 178; 435/7.1, 7.2; 73/23.39; 430/112–116, 430/137.1
See application file for complete search history.

(56) References Cited

U.S. PATENT DOCUMENTS 3,449,938 A * 6/1969 Giddings .................. 73/23.39

| 4,874,507 A * | 10/1989 | Whitlock ..................... 209/11 |
| 6,183,931 B1 * | 2/2001 | Odell .................... 430/137.22 |
| 6,454,945 B1 * | 9/2002 | Weigl et al. ................. 210/634 |
| 6,649,358 B1 * | 11/2003 | Parce et al. .................. 435/7.2 |
| 2003/0027022 A1 * | 2/2003 | Arana et al. .................. 429/17 |
| 2006/0283798 A1 | 12/2006 | Ueki et al. |

FOREIGN PATENT DOCUMENTS

| JP | A 2001-137613 | 5/2001 |
| JP | A 2001-137693 | 5/2001 |
| JP | A 2002-361002 | 12/2002 |
| JP | A 2003-24753 | 1/2003 |
| WO | WO 96/12540 | 5/1996 |
| WO | WO 96/12541 | 5/1996 |
| WO | WO 97/47390 A1 | 12/1997 |

OTHER PUBLICATIONS http://www.yourdictionary.com/bead, pp. 1-3, undated, downloaded from the Internet Sep. 15, 2008.*

* cited by examiner

*Primary Examiner*—Joseph W Drodge
(74) *Attorney, Agent, or Firm*—Oliff & Berridge, PLC (57) ABSTRACT

The present invention provides a method for treating fine particles contained in a first fluid comprising: feeding the first fluid containing the fine particles and a second fluid to generate two laminar flows; migrating a diffusible substance contained in the first fluid into the second fluid at an interface between the first fluid and the second fluid in the laminar flows; and separating the laminar flows into the first fluid containing the fine particles and the second fluid in a diverging region.

17 Claims, 4 Drawing Sheets

METHOD AND DEVICE FOR TREATING FINE PARTICLES

CROSS REFERENCE TO RELATED APPLICATION

This application claims priority under 35 USC 119 from Japanese Patent Application No.2004-38825, the disclosure of which is incorporated by reference herein.

BACKGROUND

1. Field of the Invention

The present invention relates to a method and a device for treating fine particles contained in El liquid.

2. Description of the Related Art

Conventionally, fine particles in a medium have been processed in various fine particle producing fields such as pigment producing and polymer fine particle producing. The fine particles are processed since mainly dissolution components and ion components (diffusible substance) of organic substances and inorganic substances of various chemicals used during manufacturing adsorb to the surface of the fine particles, and the fine particles are polluted.

In a general method for processing the fine particles, a slurry containing the fine particles which have been basically polluted is put in a large quantity medium (processing liquid) having no diffusible substance, or the slurry is showered with the processing liquid. Thereby the diffusible substances are diffused and diluted to reduce the concentration of the diffusible substances on the surface of the fine particles. The method is repeated as necessary, and a predetermined target is achieved.

The device is basically a batch process system using a paper filter or the like. That is, the paper filters are first selected according to the particle diameter of fine particles to be processed. The paper filter selected is set in an equipment such as a nutsche. While a collecting container of a filtrate is decompressed by a vacuum pump or the like, the liquid containing the fine particles to be processed is put on the paper filter. If the selection of the paper filter is correct, only the liquid which is almost filtered-off is collected from the nutsche or the like to the collecting container. After all fine particles in the medium are collected on the paper filter, the liquid (processing liquid) having no diffusible substance is poured on the fine particles on the paper filter, and the fine particles are processed. In fine particles having a large particle diameter or a system treated easily, a targeted processing state can be obtained. However when the fine particles have a more minute particle diameter or require substantial processing, the fine particles on the paper filter are collected and transferred to another container, and the fine particles are dispersed again in the liquid having no diffusible substance, Then the above described operation is repeated.

In order to improve the processing efficiency, the medium liquid is removed as much as possible from the fine particle aggregates after filtration, and the fine particle aggregates are processed in the liquid having no diffusible substance, or dispersed again in the medium having no diffusible substance. There are cases in which instead of using the paper filter, a filter cloth having a large region is used, and instead of performing filtration by the decompression method, a pressurizing method, or showering of the processing liquid is performed by a high-pressure atomization liquid, thereby improving the efficiency. However, in principle, the above described process is performed.

Meanwhile, in recent years, research has been carried out on various methods for performing chemical reaction and unit operation or the like in the micro field. In this connection, an extraction method and device, and a separation method and device have been proposed in view of the short diffusion time. Such devices and methods use a solvent extraction technique using a micro fluid system, but they have never been used for processing various fine particles (refer to, for example, Japanese Patent Application Publication (JP-A) No. 2002-361002).

As described above, in order to process fine particles efficiently according to the conventional process, it is necessary to remove the liquid as much as possible from the solid on the paper filter after filtration, and then to shower with the processing liquid or to disperse the solid again in the medium having no diffusible substance. However, the more the medium liquid is removed from the fine particle aggregates to improve the processing efficiency, the more rigid and stronger the fine particle aggregates become. Therefore, the liquid put in sequentially cannot permeate between the fine particles, and the surface of individual fine particles cannot be processed sufficiently.

In addition, when the fine particle aggregates are dispersed again in the processing liquid, since the aggregation strength of the fine particle aggregates is strong, the aggregates do not loosen sufficiently, and the surface of each of the individual fine particles cannot be processed. Thus, a problem arises in which the processing efficiency conflicts with the operation efficiency. Furthermore, in order to improve the processing ability, it is necessary to repeat a similar operation, which leads to a problem of loss of the fine particles to be obtained during processing of the container and collection of the solid.

SUMMARY OF THE INVENTION

The present invention has been made in view of the above circumstances and provides a method for treating fine particles contained in a medium efficiently and continuously without losing the fine particles, and a device for treating the fine particles.

A first aspect of the invention is to provide a method for treating fine particles contained in a first fluid comprising: feeding the first fluid containing the fine particles and a second fluid to generate two laminar flows; migrating a diffusible substance contained in the first fluid into the second fluid at an interface between the first fluid and the second fluid in the laminar flows; and separating the laminar flows into the first fluid containing the fine particles and the second fluid in a diverging region.

A second aspect of the invention is to provide a device for treating fine particles contained in a first fluid comprising: a laminar flow forming segment for feeding the first fluid containing the fine particles and a second fluid to generate two laminar flows; a migrating segment for migrating a diffusible substance contained in the first fluid into the second fluid at an interface between the first fluid and the second fluid in the laminar flows; and a separating segment for separating the laminar flows into the first fluid containing the fine particles and the second fluid in a diverging region.

DETAILED DESCRIPTION OF THE INVENTION

Hereinafter, the present invention will be described in detail.

The method and the device for treating fine particles contained in a first fluid according to the invention comprise: feeding the first fluid containing the fine particles and a second fluid to generate two laminar flows (laminar flow forming segment); migrating a diffusible substance contained in the first fluid into the second fluid at an interface between the first fluid and the second fluid in the laminar flows (migrating segment); and separating the laminar flows into the first fluid containing the fine particles and the second fluid in a diverging region (separating segment).

In embodiments of the method and the device for treating fine particles of the invention, the feeding of the first fluid containing the fine particles and the second fluid to generate the two laminar flows, the migrating of the diffusible substance contained in the first fluid into the second fluid, and the separating of the laminar flows into the first fluid containing the fine particles and the second fluid are repeated a plurality of times to reduce the diffusible substance contained in the first fluid sequentially.

Hereinafter, the method for treating fine particles contained in the first fluid and the device will be described.

<First Method and First Device for Treating Fine Particles>

As a device used in the first method for treating fine particles, for instance, a micro reactor which has flow passages the width of which is within the range of several to several thousand μm is used. The micro reactor used in the invention is a reactor having a plurality of flow passages (channel) of micro scale. Since the flow passage of the micro reactor is of micro scale, both the size and flow speed is small, and Reynolds number is 200 or less. Therefore, unlike a usual reactor, the reactor having the flow passage of micro scale has laminar flow rather than turbulent flow.

In the laminar flow rule, a clear interface is formed when the flows of two fluids contact each other, and a mixing due to diffusion in the interface occurs. Since the specific interface area is large in the micro scale space, the interface with which the laminar flows are in contact is advantageous for diffusion mixing.

The time required for mixing the two fluids depends on an interfacial sectional area of the two liquids and the thickness of liquid layer. The mixing time t becomes $t \propto W^2/D$ (w: flow passage width, D: diffusion factor) according to diffusion theory, and the more the passage width is reduced, the more the diffusion time is shortened. That is, if the passage width becomes $1/10$, the mixture time becomes $1/100$. The efficiency of heat exchange is extremely high since the surface area per unit volume is large, and thereby the temperature can be controlled easily. For such reasons, the reaction in the laminar flows of the micro reactor can be expected to perform uniformly compared with the reaction in the turbulent flow in the case of using a conventional macro reactor.

The present inventors have applied the diffusion mixing characteristic in the interface between the above two laminar flows to the processing of fine particles having comparatively large particle diameter dispersed in the medium, and have accomplished the invention. That is, the diffusion theory of the laminar flow rule is applied to a dispersed system in which the fine particles of nanometer order or smaller which can substantially diffuse are dispersed. For instance, when a fluid (first fluid) in which fine particles of micron order and diffusible substances are included and a fluid (second fluid) in which the amount of a diffusible substance is minimal form laminar flows, the fine particles hardly diffuse from the first fluid, and only the diffusible substances diffuse (migrate) to the second fluid.

In addition, since the time required for diffusion is short through the interface of laminar flows where the flow passage width is narrow so that the two laminar flows are formed, the migration of the diffusible substance to the second fluid can be performed effectively. Therefore, the present inventors have found that by utilizing the migration of such a diffusible substance, the fine particles having comparatively large particle diameter dispersed in the medium can be processed efficiently.

Figure 1:
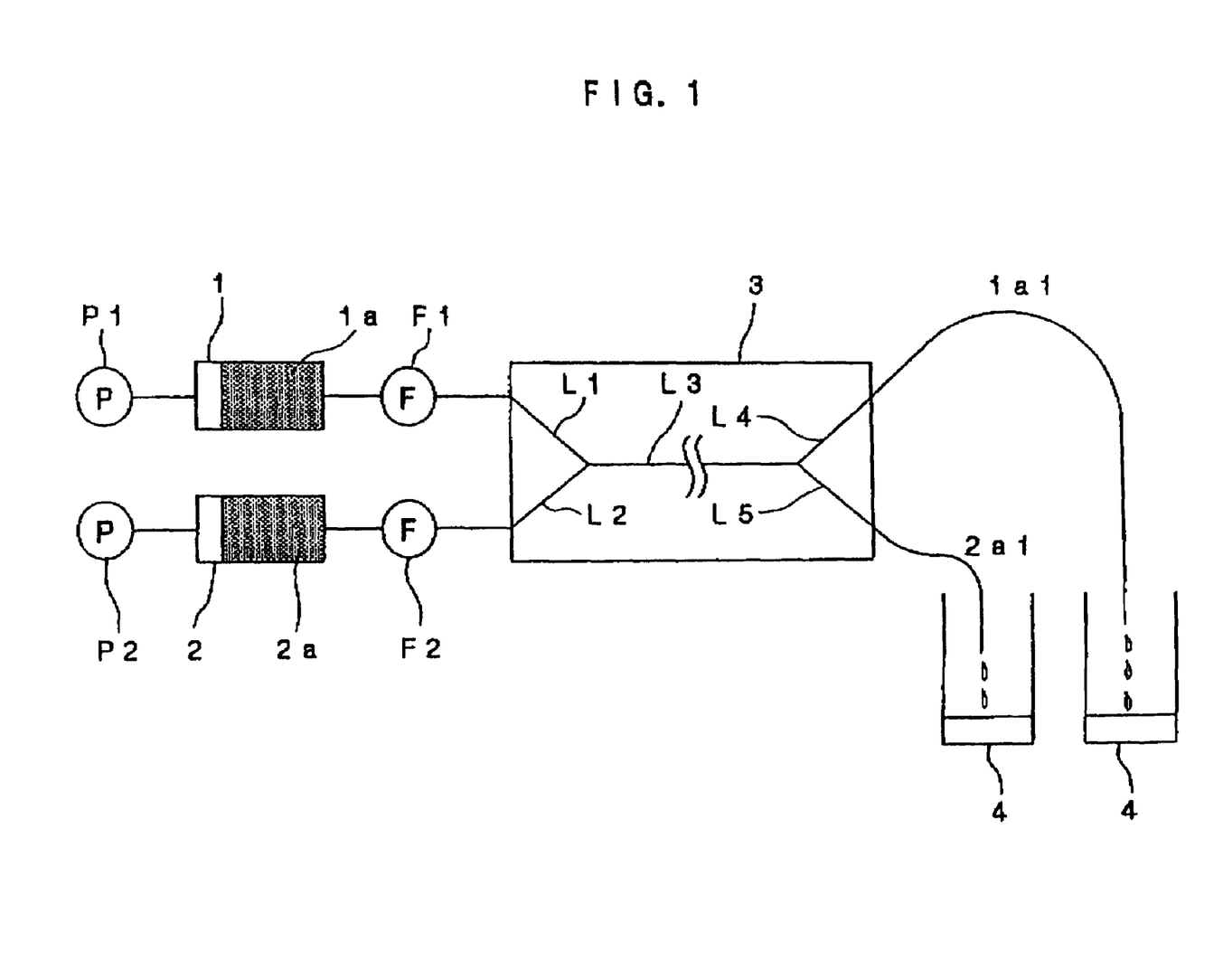
FIG. 1 is a schematic block diagram showing an example of a device for treating fine particles of the invention.

FIG. 1 is a schematic block diagram showing an example of a device suitably used for a method for treating fine particles of the invention.

The device for treating fine particles shown in FIG. 1 has a first flow passage L1 passing a fluid 1a (first fluid) containing the fine particles to be treated, a flow passage L2 passing a fluid (for instance, a cleaning fluid) 2a (second fluid) having no diffusible substance, a laminar flow forming segment which is connected to the terminal parts of the flow passages L1, L2 in a micro reactor 3 and makes the fluid 1a and the fluid 2a merge to generate two laminar flows, a flow passage L3 (migrating segment) which migrates a diffusible substance in the laminar flows formed, and a separating segment which separates the flow passage L3 to the flow passage L4 and the flow passage L5 to obtain a fluid 1a1 (first fluid) and a fluid 2a1 (second fluid).

A micro syringe 1 containing the fluid 1a is connected to the edge of the upstream side of the flow passage L1, and a micro syringe 2 containing the fluid 2a is connected to the edge of the upstream side of the passage L2.

The fluid 1a in the micro syringe 1 is a medium containing the fine particles which should be treated as described above. It is preferable that the fine particles contained in the fluid 1a have a primary particle diameter and are almost uniformly dispersed in the medium. The fine particles may be mixed in two or more kinds.

The volume average particle diameter of the fine particles (dispersed particle diameter) should not be too big, and the volume average particle diameter is preferably within the range of about 0.1 to about 1000 μm, more preferably 0.1 to 500 μm, further more preferably 0.1 to 200 μm, and particularly preferably 0.1 to 50 μm. When the particle diameter is less than 0.1 μm, the separation of the fine particles from the medium at the end of the production, or the migration of only the diffusible substance in the laminar flows may be difficult. When the particle diameter of the fine particles is more than 1000 μm, the flow passage may be clogged up with the fine particles.

It is preferable to select the width of the flow passage properly according to the particle diameter.

It is preferable that the particle size distribution of the fine particles is within the range of about 1 to about 3 in GSD which is a general index, and more preferably 1 to 2.5. When the GSD is larger than 3, the flow passage may be easily clogged up with the coarse particles, or minute particles may be migrated to a processing liquid. The GSD is obtained as follows. The cumulative distribution of the particle size measured, to the range (channel) of the particle size divided, is drawn from the small particle diameter. When the particle diameter of the volume accumulation of 16% is D16 and the particle diameter of the volume accumulation of 84% is D84, the GSD is the value obtained from D84/D16. Specifically, the GSD can be measured by using a Coulter counter (manufactured by Beckman Coulter, Inc.).

Although the true specific gravity of the fine particles is not particularly limited as long as the fine particles are almost uniformly dispersed in the medium, the true specific gravity is preferably within the range of about 0.5 to about 5.0, and more preferably 0.7 to 2.0. When the true specific gravity of the fine particles is less than 0.5, the fine particles easily float on the surface of the medium, and cannot be uniformly dispersed in some cases. When the true specific gravity of the fine particles is more than 5, the fine particles may sink to the bottom of the medium and cannot be dispersed uniformly in some cases.

The solid content of the fluid 1a containing the fine particles is preferably within the range of about 1 to about 60 by % by volume. The solid content is more preferably within the range of 5 to 50%, and further more preferably 10 to 40%. When the solid content of the fine particles is less than 1%, processing of the fine particles will be inefficient. When the solid content is more than 60%, the probability of fine particles clogging the flow passage increases.

The % by volume of the solid content can be calculated from the ratio of all moisture volume calculation value from a solid-liquid separating method such as filtration and measurement of the amount of moisture of the solid slurry using a thermo balance to first dispersing liquid volume.

Although the shape of the fine particles is not particularly limited, when the fine particles have a needle shape and the major axis is larger than ¼ of the width of the flow passage, the probability of clogging by fine particles unpreferably increases. In this regard, the ratio of the major axis and the minor axis of the fine particles (length of the major axis/length of the minor axis) is within the range of 1 to 50, and more preferably 1 to 20.

Examples of the fine particles include the following, but are not limited thereto. Specific examples include crystals or aggregates of organic substances and inorganic substances such as polymer fine particles and pigments, metal fine particles, and metal compound fine particles such as metal oxide fine particles, metal sulfide fine particles and metal nitride fine particles.

Specific examples of the polymer fine particles include polyvinyl butyral resin fine particles, polyvinyl acetal resin fine particles, polyarylate resin fine particles, polycarbonate resin fine particles, polyester resin fine particles, phenoxy resin fine particles, polyvinyl chloride resin fine particles, polyvinylidene chloride resin fine particles, polyvinyl acetate resin fine particles, polystyrene resin fine particles, acrylic resin fine particles, methacrylic resin fine particles, polyacrylamide resin fine particles, polyamide resin fine particles, polyvinyl pyridine resin fine particles, cellulose system resin fine particles, polyurethane resin fine particles, epoxy resin fine particles, silicone resin fine particles, polyvinyl alcohol resin fine particles, casein fine particles, vinyl chloride-vinyl acetate copolymer fine particles, modified vinyl chloride-vinyl acetate copolymer fine particles, vinyl chloride-vinyl acetate-maleic acid anhydride copolymer fine particles, styrene-butadiene copolymer fine particles, vinylidene chloride-acrylonitrile copolymer fine particles, styrene-alkyd resin fine particles and phenol-formaldehyde resin fine particles.

Examples of the metal fine particles and the metal oxide fine particles include metal fine particles such as carbon black fine particles, zinc fine particles, aluminum fine particles, copper fine particles, iron fine particles, nickel fine particles, chrome fine particles, titanium fine particles, and fine particles of alloys thereof, metal oxide fine particles such as $TiO_2$ fine particles, $SnO_2$ fine particles, $Sb_2O_3$ fine particles, $In_2O_3$ fine particles, ZnO fine particles, MgO fine particles and iron oxide fine particles, and fine particles obtained by combining two or more of these compounds.

Although there are various kinds of methods for producing the fine particles, the fine particles are often synthesized in the medium and subsequently processed without undergoing any additional treatment. Massive matters may be mechanically crushed to produce the fine particles, and the fine particles produced may be dispersed in the medium and the resultant dispersion is processed. In this case, the massive matters are often crushed in the medium, and the medium including the fine particles is subsequently processed.

On the other hand, when powders (fine particles) produced by a dry method are processed, the powders must be dispersed in the medium in advance. Examples of methods for dispersing the dry powders in the medium include a sand mill, a colloid mill, an attritor, a ball mill, a dyno mill, a high-pressure homogenizer, an ultrasonic dispersion machine, a coball mill, and a roll mill. In this case, the dry powders are preferably dispersed on the condition that the primary particles are not crushed by the dispersion.

Although the types of the mediums of the fluid 1a are determined according to a relation with the fine particles, the types are not basically limited. Examples of the types include water, a water system medium and an organic solvent system medium.

Although a same type of medium as the medium of the fluid 1a is usually used as the fluid (processing liquid) of the fluid 2a, it is not necessarily the same type.

Examples of water include ion-exchanged water, distilled water, and electrolysis ion water. Specific examples of the organic solvent system medium include methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, toluene, xylene, and a mixture of two or more thereof.

It is a necessary condition that the fluid 2a which is the processing liquid, has no diffusible substance. Herein, "the fluid 2a has no diffusible substances" means that the amount of the diffusible substance is half or less than that of the diffusible substance contained in the first fluid.

For instance, refined water such as ion-exchanged water, pure water, and distilled water is used as the fluid 2a which is the processing liquid. The diffusible substances of sub-micron order are removed by a membrane filter if necessary, and the fluid 2a is used. The diffusible substance means, for example, an ionic substance or a substance which can be dissolved in a solvent. Specific examples of the diffusible substances include pollution substances such as dispersants, stabilizers, processing agents and surfactants used at the time of forming the particles.

Next, the device for treating fine particles of the invention shown in FIG. 1 will be described.

The fluid 1a contained in the micro syringe 1 and the fluid 2a contained in the micro syringe 2 are respectively pushed out to flow passages L1, L2 by liquid feed pumps P1, P2, and fed to the micro reactor 3. The fluid 1a and the fluid 2a merge in the flow passage L3.

The passages (channel) L1, L2, L3, L4, L5 of the micro reactor 3 are of milli-scale or micro scale. That is, it is preferable that the flaw passage width of the flow passage L1, L2, L3, L4, L5 is 5 mm or less, more preferably within the range of 0.01 to 1 mm, and further more preferably 0.03 to 0.5 mm. Therefore, both the flow rate and flow speed of the fluid are small, and the Reynolds number becomes small in the micro reactor 3.

The flow passages L1, L2, L3, L4, L5 of the micro reactor 3 are produced on a solid substrate by micro fabrication techniques. Examples of the materials used for the substrate include glass, ceramics, silicon and rubber system PDMS (polydimethyl silicone). A plastic resin can also be used.

Examples of the micro fabrication methods for forming the flow passages L1, L2, L3, L4, L5 include a method for using LIGA technique using an X-ray, a method for using a resist part as a structure by a photolithography method, a method for etching a resist opening, a micro discharge machining method, a laser beam machining method, and a mechanical micro cutting method using a micro tool made of a hard material such as diamond. These techniques may be used singly or in combination.

When the micro reactor 3 is assembled, a junction technique is used. The junction technique is roughly divided into a solid-phase welding and a liquid-phase welding. Examples of the solid-phase welding include anodic joining, direct joining, and diffusion joining. The liquid-phase welding includes fusion welding, usage of an adhesive, and the like.

A heater is set in the micro reactor 3, and the temperature of the micro reactor 3 is adjusted by a temperature controller. A metal resistance and poly silicon or the like are used as the heater, and the heater may be built in the micro reactor 3. The micro reactor 3 may be put in a container the temperature of which is controlled for controlling the temperature of the micro reactor 3.

Next, the flow of the fluid in the micro reactor will be described.

Unlike a conventional batch device, the flow in the flow passage of the micro reactor 3 is not turbulent flow but laminar flow since the flow passage width is narrow, and the Reynolds number is small.

Figure 2:
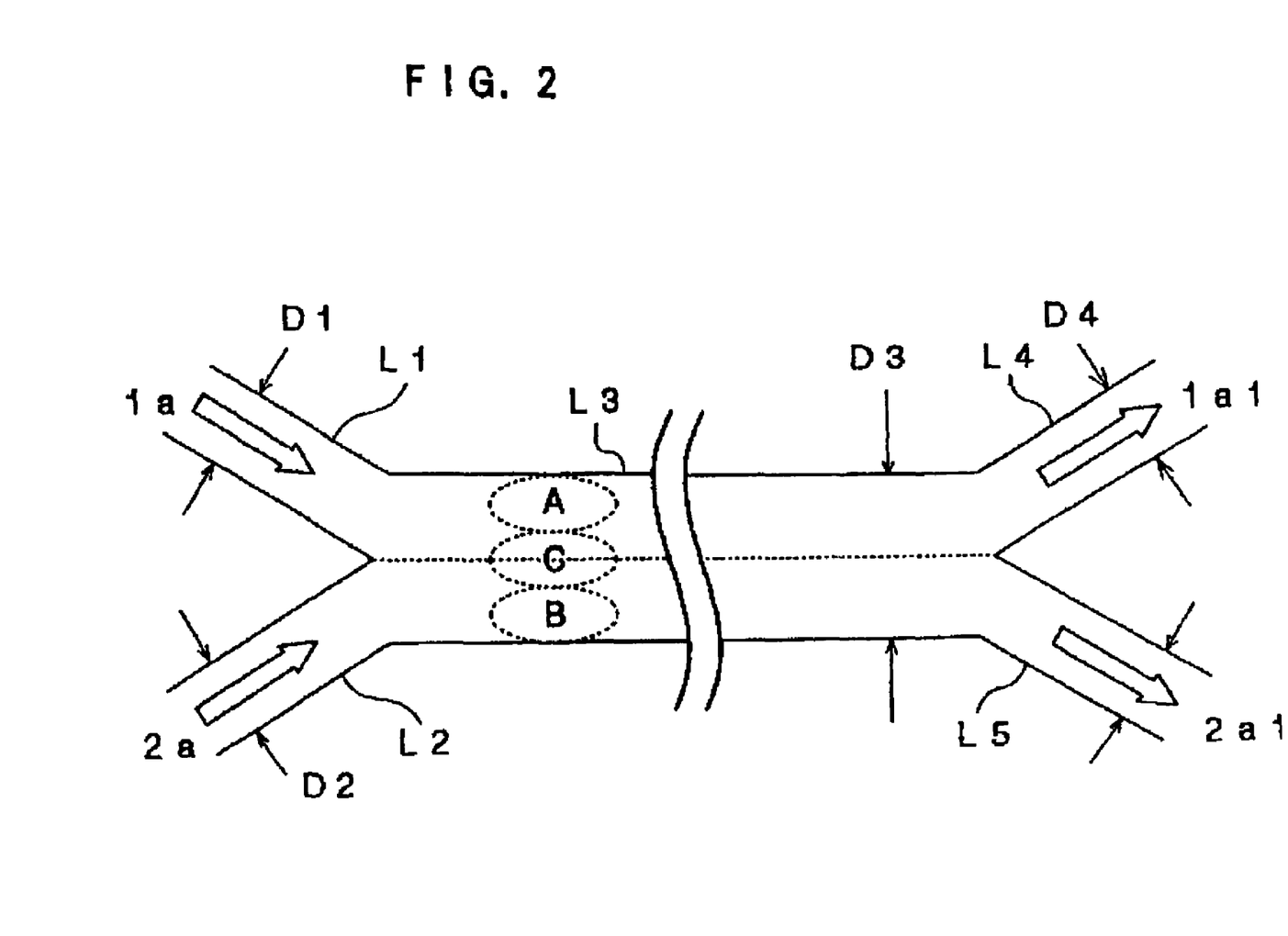
FIG. 2 is an explanatory diagram conceptually showing a state in which fluids merge with each other in a micro reactor.

FIG. 2 conceptually shows the state in which the first fluid 1a containing the fine particles and the second fluid 2a as the processing liquid merge each other in a micro reactor 3.

In FIG. 2, the fluid 1a (first fluid) containing the fine particles to be processed, and the fluid 2a (second fluid) having no diffusible substance flow into the passage L3 respectively from the flow passage L1 and from passage L2. The flow passage L3 is respectively connected to the terminal parts of the flow passages L1, L2, and the fluid 1a and the fluid 2a merge to generate laminar flow. In addition, the flow passage L3 is divided into the flow passage L4 and the flow passage L5, and the flow passage L4 and the flow passage L5 obtain the liquid 1a1 (first fluid) and the liquid 2a1 (second fluid) respectively.

As shown in Figure, when the fluid 1a and the fluid 2a merge in the passage L3, two laminar flows are generated, and a region A containing mainly fluid 1a, a region B containing mainly of the fluid 2a, and a region C as an interfacial region between the region A and the region B are formed. The fine particles are carried to the passage L4 while getting on the flow of the fluid 1a almost without diffusing. On the other hand, the diffusible substances contained in the fluid 1a are diffused from the region A to the region B through the interfacial region C, and the diffusible substances of the surface of the fine particles contained in the fluid 1a are reduced and processed. The diffusible substances are often contained also inside the fine particles. In this case, the diffusible substances are diffused and removed from the inside to the surface by reducing the concentration of the diffusible substances on the surface, and the concentration of the diffusible substances as the entire fine particles is reduced (processed).

The fluid 1a in which the diffusible substances are reduced and the fluid 2a to which the diffusible substances diffuses and migrates are respectively divided into the flow passage L4 and the flow passage L5 according to each flow passage width to become the fluid 1a1 and the fluid 2a1. The fluid 1a1 containing the fine particles processed is obtained from the outlet of the flow passage L4, and the fluid 2a1 which is the polluted processing waste liquid from the outlet of the flow passage L5 is taken out.

As shown in FIG. 2, among the flow passages that the micro reactor 3 has, the flow passage diameter (flow passage width) $D_1$ of the first flow passage L1 passing the first fluid 1a is preferably almost the same as the flow passage diameter $D_2$ of the second flow passage L2 passing the second fluid 2a. The flow passage diameter $D_1$ may not necessarily be the same as the flow passage diameter $D_2$. Specifically, the flow passage diameters $D_1$, $D_2$ are preferably within the range of 0.01 to 1.5, and more preferably 0.03 to 0.08.

The flow passage diameter $D_3$ of the flow passage L3 may be set to almost $D_1+D_2$, but is not limited thereto. Although the flow passage diameter $D_4$ and the flow passage diameter $D_5$ are basically set according to the relationship with the passage width in the flow passage L3 region of the fluid 1a and the fluid 2a, the flow passage diameter $D_4$ and the flow passage diameter $D_5$ are not limited.

However, judging from the principle of processing in the invention as described above, it is expected that the diffusible substances contained in the fluid 1a reach the concentration equilibrium with the fluid 2a1 in the flow passage L4, that is, in the position which becomes the fluid 1a1. Therefore, the flow passage L4 can collect all the fine particles getting on the laminar flow and flowing in. In addition, the flow passage L4 preferably has an appropriate flow passage width $D_4$ in which liquid around the fine particles do not flow superfluously.

The passage width of the fluid 1a and the passage width of the fluid 2a in the two laminar flows depend on the liquid feed flow rate of each fluid in the method, and the larger the liquid feed flow rate, the larger the passage width. In the invention, it is preferable that the liquid feed speed $V_1$ (liquid feed flow rate) of the first fluid 1a containing the fine particles to be processed is set to not higher than the liquid feed speed $V_2$ liquid feed flow rate) of the second fluid 2a which is the processing liquid, since the processing degree can be further improved. It is preferable that the passage width of the fluid 1a becomes narrower than the passage width of the fluid 2a in the two laminar flows as the ratio of the liquid feed flow rate of fluid 2a to the liquid feed speed of the fluid 1a is increased.

The passage width of the fluid 1a and the fluid 2a on the flow passage L3 corresponds to the passage width of passage L4 and passage L5. In order to perform efficient processing, the flow passage width $D_4$ of the flow passage L4 is preferably smaller than the flow passage width $D_5$ of the flow passage L5 according to the ratio at the liquid feed speeds of the fluid 1a and the fluid 2a.

The liquid feed speed $V_1$ of the first fluid 1a and the liquid feed speed $V_2$ of the 2nd fluid 2a are preferably within the range of about 0.01 to about 50 ml/hr, and more preferably within the range of 0.05 to 1 ml/hr. However the liquid feed speed $V_1$ and the liquid feed speed $V_2$ can be arbitrarily set according to the length of the flow passage L3.

The ratio N ($V_2/V_1$) of the liquid feed speed $V_2$ of the second fluid 2a to liquid feed speed $V_1$ of the first fluid 1a is within the range of about 1.0 to about 50, and more preferably 3 to 20. When N is less than 1.0, the improvement in the processing effect of the fine particles in the laminar flow may be small. When N is more than 50, handling as a fluid may become difficult.

Figure 3:
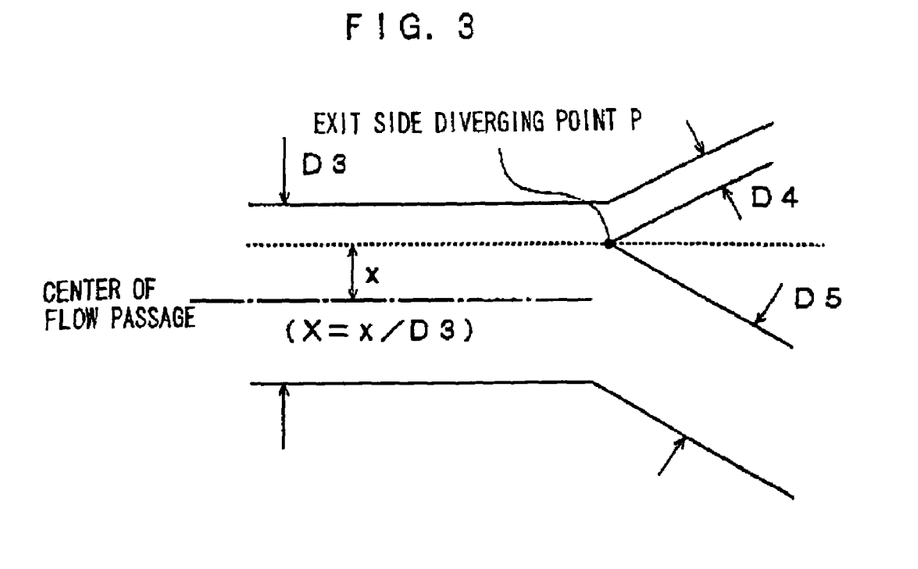
FIG. 3 is an explanatory diagram conceptually showing a condition in the vicinity of the divergence of fluids in a micro reactor.

In addition, in order to clarify the range which seems to be extremely efficient, the change in the passage widths of the fluid $1a$ and the fluid $2a$ when the liquid feed speed of the fluid $2a$ is N times as large as the liquid feed speed of the fluid $1a$ is examined. Specifically, as shown in FIG. 3, x represents a deviation from the center of the flow passage L3 of the diverging point P of the fluid $1a$ and the fluid $2a$. Ratio X of the deviation x to the flow passage width D3, to liquid feed speed ratio (liquid feed flow rate ratio) N is plotted.

Figure 4:
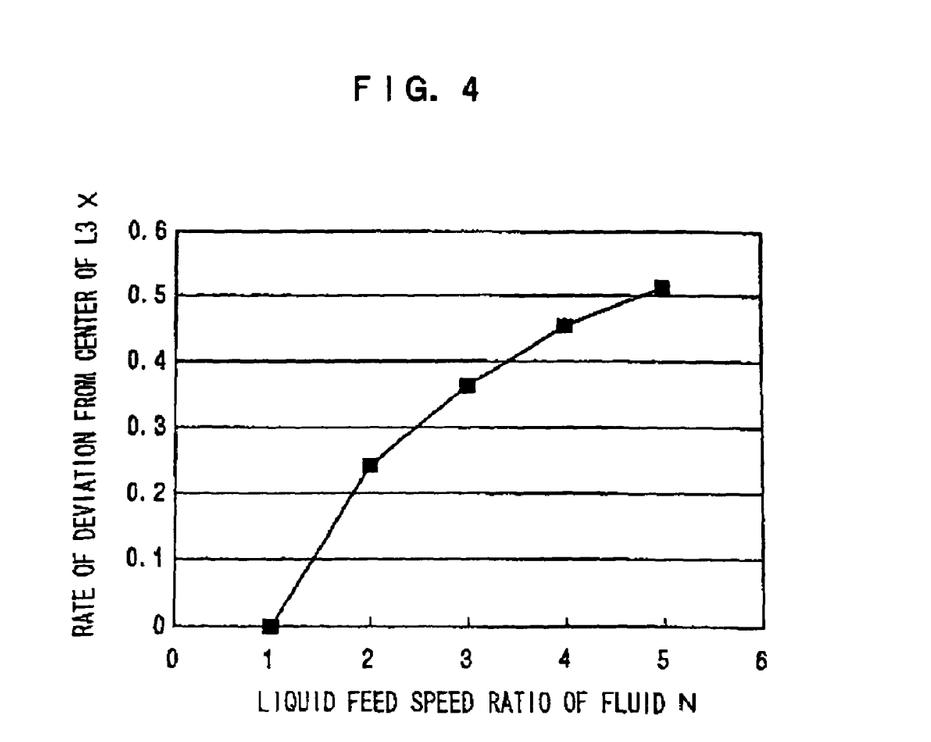
FIG. 4 is a graph showing the relationship between liquid feed speed ratio and the shift in position of the diverging point of fluids.

The result of the plot is shown in FIG. 4. The curve of the plot is approximated by the logarithmic function, and represented by the following formula (1').

$$X = 0.164 \times \ln N \quad \text{Formula (1')}$$

When the error margin from the approximation formula is included in X, X is represented by following formula (1).

$$X = 0.164 \times \ln N + E \quad \text{Formula (1)}$$

In formulae (1') and (1), N is a real number of 1 to 20, and E indicates an error range of 0 to −0.1. Since the flow passage width $D_4$ must be 0.01 mm or more, the value takes priority over the equation.

That is, in the method for treating fine particles of the invention, the diverging point P of the first fluid $1a$ and the second fluid $2a$ exists on the liquid feed direction line moved to the first fluid $1a$ in the ratio X represented by the above formula (1) from the center of the flow passage L3. Therefore, extremely efficient processing can be performed.

The part of flow passages L1, L2, L3, L4, L5 in the micro reactor 3 may have the structure as described above, and particularly, the structure of the part exposed from the micro reactor 3 is not limited.

In addition, it is often the case that the temperature of the first fluid $1a$ supplied to the micro reactor 3 is preferably high and below the boiling point of the medium. The temperature which is about 10° C. lower than the boiling point is preferable. The treating accuracy deteriorates near boiling point, and problems such as bubble generation or the like may occur. It is preferable that the temperature of the second fluid $2a$ is the same temperature as that of the first fluid $1a$. Basically, it is preferable that the entire micro reactor flow passage is set to the same temperature by the heater.

The time required for processing the fine particles depends on the interfacial sectional area between the fluids, and the thickness of the liquid layer in the micro reactor 3 as described above. The mixture time t becomes $t \propto W^2/D$ (w: flow passage width, D: diffusion factor) according to diffusion theory, and the more the passage width is reduced, the more the diffusion time is rapidly shortened. That is, if the passage width becomes 1/10, the mixture time becomes 1/100. The efficiency of heat exchange is extremely high since the surface area per unit volume is large, and thereby the temperature can be controlled easily. Therefore, the diffusible substances can be removed in a short time by using the micro reactor 3 having a small flow passage width in which two laminar flows flow as a device for treating fine particles of the invention, and thereby the fine particles can be processed.

If the flow passage L3 has sufficient flow passage length for securing time required for processing the fluid to reach the targeted processing state while the fluid flows in the flow passage L3, the flow passage length is not particularly limited. For instance, when the liquid feed speed of two laminar flows is within the range of 200 to 2000 mm/sec, it is preferable that the length of the flow passage L3 is within the range of 50 to 500 mm in view of the processing level and productivity of the final fine particles.

If the region for causing the laminar flow can be secured in the flow passage L3, the flow passage L3 may have a wave shape or a saw blade shape in order to make the flow passage L3 long. A beaker and a flask or the like can be used as a container 4 for the collecting the fluids $1a1$, $2a1$.

The fine particles processed exist in the fluid $1a1$ stored in the container 4. The dispersion liquid may be supplied to the next process as it is, and the dispersion liquid may be used as a solid in the next process by filtering and drying it.

Almost 100% of the fine particles contained in the fluid $1a$ can be collected in fluid $1a1$ by separating the flow passage L4 and L5 accurately.

<Second Method and Second Device for Treating Fine Particles>

In the second method and second device for treating fine particles of the invention, the first method and first device for treating the fine particles is repeated a plurality of ties until the processing state of the target fine particles is obtained, and the fine particles contained in the first fluid are processed by reducing the amount of diffusible substances contained in the first fluid sequentially.

Since the method and device for treating fine particles of the invention use the laminar flows having a large interfacial area in which the laminar flows are mutually in contact with each other, the efficiency in processing the fine particles is excellent. However, when the amount of diffusible substances contained in the first fluid is large, and an attempt is made to obtain the aimed processing level by performing the process using the micro reactor once, it is necessary to lengthen the length of the flow passage (L3) in the laminar flow forming part considerably, and problems may be caused in the design and cost of the device.

It is unpreferable in view of the processing cost to use the processing liquid having a considerably small amount of the diffusible substances every time the processing liquid is used for processing the fine particles. Even if the processing liquid is used once in the micro reactor, when the amount of diffusible substances is less than that contained in the fluid first, it is preferable to use the processing liquid repeatedly.

In view of the above point, in the second method and second device for treating fine particles of the invention, the process due to a first method and first device for treating the fine particles is repeated. That is, for instance, a process is performed once or more (the processing frequency is k-th, and k is 2 or more), for making the fluid $1a1$ and fluid $2a1$ divided into the passage L4 and the passage L5 respectively in FIG. 2 pass through the micro reactor 3 as the first fluid and the second fluid again.

In this case, the fluid $2a1$ collected may be used as a processing liquid which is the second fluid. A new processing liquid containing a very small amount of diffusible substances may be used as well as the first process. In addition, the fluid $2a1$ and the new processing liquid may be used by mixing. It is sufficient that the amount of the diffusible substances contained in the processing liquid used is ½ or less than the amount of the diffusible substances contained in the first fluid in k-th process.

The same device may be used as a device used in the above repeating process (for instance, the fluid $1a1$ collected from the micro reactor 3 is fed to the passage L1 of the same micro reactor 3 again). A device having a plurality of devices which are connected may be used. In this case, the device to be connected may be same or different.

Figure 5:
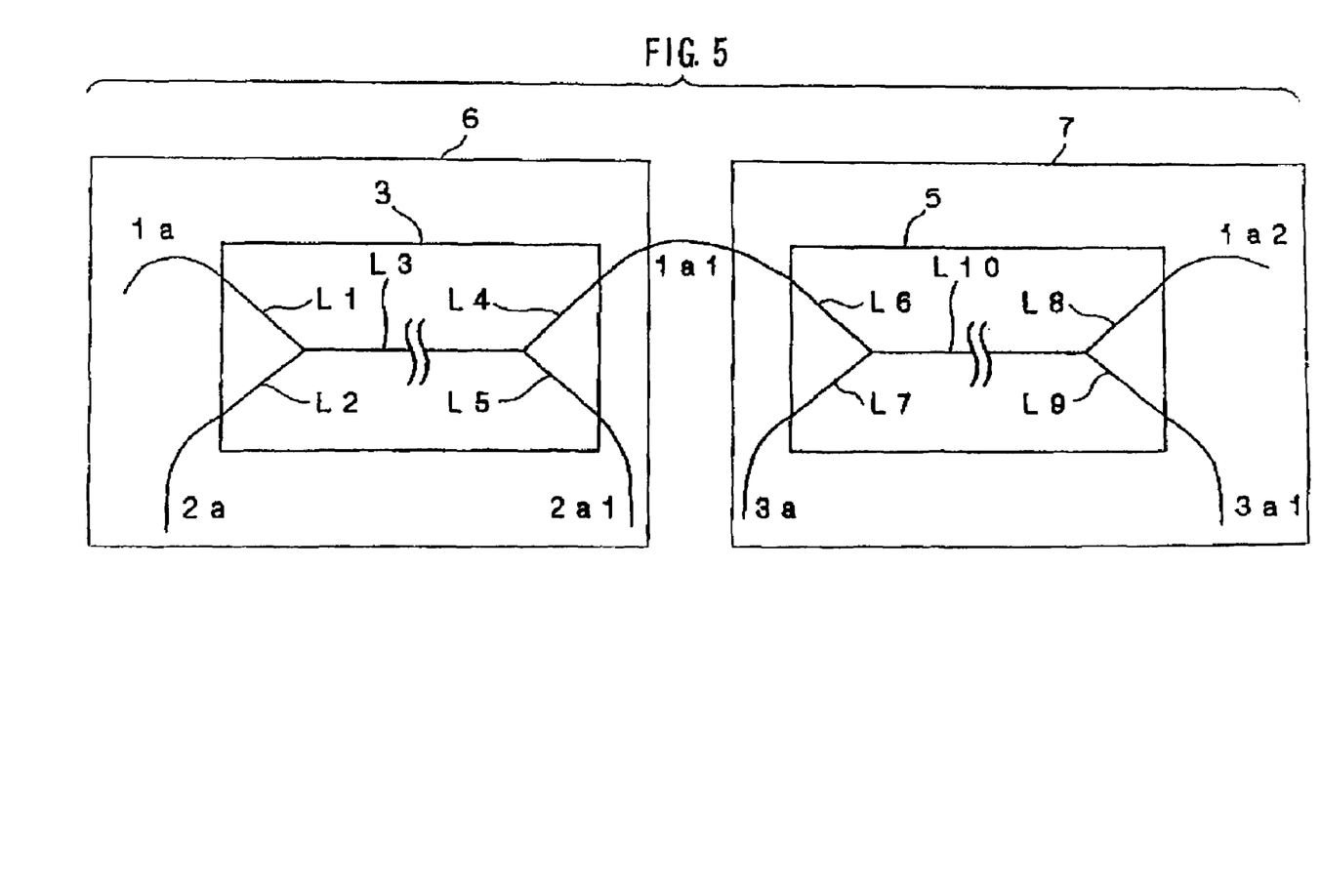
FIG. 5 is a schematic block diagram showing another example of a device for treating fine particles of the invention.

FIG. 5 is a schematic block diagram showing an example of a device suitably used for a second method for treating fine particles.

The device shown in FIG. 5 is the device having a plurality of connected devices, and specifically, is a device having two connected micro reactors 3. The device 6 in FIG. 5 is basically similar to the device explained in FIG. 1. The fluid 1a1 collected from the device 6 is fed to the following micro reactor 5 as the first fluid 1a1 containing the fine particles by connecting the flow passage L4 with the passage L6 of the device 7. The second fluid 3a which is the processing liquid is fed to the passage L7 of the device 7.

Herein, although the fluid for processing which is same as the fluid 2a is basically used as the fluid 3a, as described above, different liquids such as the processing liquid used for processing may be used.

The fluid 1a1 and fluid 3a fed merge at the flow passage L10, two laminar flows are generated in the same manner as the device in FIG. 1, and the diffusible substances contained in the fluid 1a1 are diffused to the fluid 3a. Therefore, the fine particles contained in fluid 1a1 are processed. Afterwards, the fluid 1a1 in which the diffusible substances are reduced, and the fluid 3a to which the diffusible substances migrate are respectively divided into the flow passage L8 and the flow passage L9. The fluid 1a1 and the fluid 3a become the fluid 1a2 and the fluid 3a1, respectively.

The fluid 3a1 is a liquid to which diffusible substances are migrated. On the other hand, the processing degree of the fluid 1a2 is higher than that of the fluid 1a1, and the fluid 1ak which is the targeted processing degree is obtained by repeating the process k times.

k is preferably within the range of 2 to 50 in view of the processing efficiency of the fine particles, the cost of the device, or the like.

The fluid which can be used as the fluid 2a can be used as the fluid 3a for processing. It is preferable that the passage width of the flow passages L6 to L10 of the device 7 is in the range that is described for L1 to L5. In addition, it is preferable that the liquid feed speed $V_3$ and liquid feed speed $V_4$ of the fluid 1a1 and the fluid 3a, and liquid feed speed ratios $V_4/V_3$ are in the ranges that are described for $V_1$, $V_2$, and $V_2/V_1$.

As described above, the fine particles having a comparatively large particle diameter can be efficiently processed in high yield by using the method and the device for treating the fine particles of the invention. Particularly, the invention can be suitably used as a method and device for treating toner particles, functional fine particles for cosmetics, and fine particles for spacers, or the like manufactured by a wet method.

EXAMPLES

Hereinafter, the present invention will be further described by way of Examples. However the invention is not at all limited by the following Examples. In the following Examples, "part" means "part by mass".

First of all, methods for measuring various characteristics will be described in the following Examples and Comparative Examples. (Particle Diameter and Particle Size Distribution of Fine Particles) Coulter counter TA-II type -(trade name, manufactured by Beckman Coulter, Inc.) is used for measuring the average particle diameter of the fine particles. In this case, the optimum aperture according to the particle diameter level of the fine particles is used for the measurement. The particle diameter of the fine particles measured is shown by the volume average particle diameter. The particle size distribution is shown in GSD which is a general index. The GSD is obtained as follows. The cumulative distribution of the particle size measured, to the range (channel) of the particle size divided, is drawn from the small particle diameter. When the particle diameter of the volume accumulation of 16% is D16 and the particle diameter of the volume accumulation of 84% is D84, the GSD is the value obtained from D84/D16.

However, when the particle diameter of the fine particles is about 5 μm or less, the particle diameter is measured by a laser diffraction scattering particle size distribution measuring apparatus (trade name: LA-700, manufactured by Horiba, Ltd.). In addition, when the particle diameter has nanometer-order, the particle diameter is measured by a BET specific surface area measuring apparatus (trade name: Flow SorbII2300, manufactured by Shimadzu Corporation).

(Measurement of Electroconductivity)

The electroconducitivity of the fluid which is an index of the process degree of the fine particles is measured by an electroconductivity meter (trade name: CM-40S manufactured by TOM company). The electroconductivity of the filtrate of the liquid measured or supernatant by the centrifugal separation or the like is preferably measured. The electroconductivity has a relative relationship with the amount of the diffusible substances.

The molecular weight of the resin used is measured by using gel permeation chromatography (trade name: HLC-8020, manufactured by Tosoh Corporation).

EXAMPLE 1

(Preparation of a Dispersion Liquid of Fine Resin Particles)

Preparation of an Oil Phase 1

The oil phase 1 (resin solution) is prepared in the following manner.

| | |
|---|---|
| polyester resin (weight average molecular weight: 9000) | 120 parts |
| ethyl acetate | 60 parts |

The components are applied to a homomixer (trade name: Ace Homogenizer, manufactured by Nippon Seiki Co., Ltd.). The components are stirred at a rotational speed of 15000 rmp for 2 minutes, and thereby a fluid A which is a homogenous solution is prepared.

Preparation of a Water Phase 1

The water phase 1 (a calcium carbonate aqueous solution) is prepared in the following manner.

| | |
|---|---|
| calcium carbonate (volume average particle diameter: 0.03 μm) | 60 parts |
| pure water | 40 parts |

The water phase 1 is obtained by mixing and stirring the components in a ball mill for 4 days. The volume average particle diameter of the calcium carbonate particles contained in the water phase 1 is about 0.08 μm based on the measurement of the laser diffraction scattering particle size distribution measuring apparatus (trade name: LA-700, manufactured by Horiba, Ltd.).

| Preparation of a water phase 2 | |
|---|---|
| carboxymethylcellulose (viscosity: 500 to 800 seconds) | 2 parts |
| pure water | 98 parts |

The components are mixed, dissolved, and thereby the water phase 2 is obtained (aqueous solution of carboxymethyl cellulose).

Preparation of a Dispersion Liquid of Fine Resin Particles

The dispersion liquid of fine resin particles as the first fluid is produced as follows.

| | |
|---|---|
| oil phase 1 | 60 parts |
| water phase 1 | 10 parts |
| water phase 2 | 30 parts |

The liquid phases are applied to a colloid mill (manufactured by Nippon Seiki Co., Ltd.). A gap distance is set to 1.5 mm, and the liquid phases are emulsified at a rotational speed of 8000 rmp for 20 minutes. The emulsified material is then applied to a rotary evaporator, and the desolvation is performed for 3 hours at the room temperature under a reduced pressure of 4000 Pa. After hydrochloric acid of 12N is added to the emulsified material until pH reaches 2 and calcium carbonate is removed from the surface of the fine particles, sodium hydroxide of 10N is added until pH reaches 10. The emulsified material is then stirred in a supersonic treating vessel by a stirrer for 1 hour. The volume average particle diameter of the fine resin particles contained in the dispersion liquid of fine particles obtained is 8.0 μm, and GSD which is an indicator of the particle size distribution is 1.20.

(Processing of Fine Particles)

The solid content of the liquid containing fine particles as described above is adjusted to 20% by volume, and a first fluid is produced. An ion-exchanged water is used as the second fluid.

The first fluid and the second fluid thus obtained are set to the micro syringe 1, 2 provided with pumps P1, P2 of the device shown in FIG. 1, and are fed to an inlet part of the micro reactor 3 at a constant flow rate.

The flow passages L1, L2, L3, L4, L5 of the micro reactor 3 have a width of 100 μm respectively, and a depth of 40 μm. The flow passage L3 has a length of 8 cm. The flow rate (liquid feed speed) of the first fluid 1a is set to 0.02 ml/hr, and the flow rate (liquid feed speed) of the second fluid 2a is set to 0.18 ml/hr and they are fed. The first fluid 1a and the second fluid 2a merge at the flow passage L3 to generate two laminar flows. The liquid feed speed of the laminar flow in the flow passage L3 is about 800 mm/sec by the calculation.

The laminar flows merged is set to 40° C. by the temperature controller. The fine particles in the fluid 1a are processed in the state, and the fluid 1a1 containing the fine particles processed is continuously collected from the flow passage L4. There is neither leak nor loss of the fine particles at this time.

When the fine particles are filtered and separated from the obtained fluid 1a1 containing the fine particles, and the electroconductivity of the filtrate which is an index of the staining of the fine particles is examined, the fluid 1a before being processed has electroconductivity of about 4000 μS/cm, and the fluid 1a1 after being processed has electroconductivity of about 400 μS/cm. It is confirmed that the target process can be performed continuously and promptly. In this case, the acid and the alkali ion materials correspond to the diffusible substance.

EXAMPLES 2 to 5

In the same manner as in Example 1, a dispersion liquid of fine resin particles in which the solid content is adjusted to 20% by volume is used as the first fluid, and an ion-exchanged water is used as the second fluid. The first fluid and the second fluid are set to the micro syringe 1, 2 provided with pumps P1, P2 of the device shown in FIG. 1, and are fed to an inlet part of the micro reactor 3 at a constant flow rate. They are evaluated in the same manner as Example 1.

At this time, the flow passage widths $D_1$, $D_2$ of the flow passages L1, L2 of the micro reactor 3 are respectively set to 100 μm. The flow passage width $D_3$ of the flow passage L3 is set to 200 μm. The depth is set to 50 μm. The length of L3 is set to 4 cm. The liquid feed speeds of the fluid 1a and the fluid 2a in the Examples are respectively set to the values shown in Table 1.

The fluid 1a and the fluid 2a are fed under the above condition, and the flow passage widths $D_4$, $D_5$ of the flow passages L4, L5 are determined from the position of an exit side diverging point P in FIG. 3 obtained by liquid feed speed ratio N of the fluid 2a to the fluid 1a and formula (1). The fine particles are filtered and separated from the fluid 1a1 containing the fine particles after divergence, and the electroconductivity is measured. Thereby, the processing state is examined. Table 1 shows the results.

TABLE 1

| | 1a liquid feed speed [ml/hr] | 2a liquid feed speed [ml/hr] | N | X | $D_4$ [μm] | $D_5$ [μm] | Electroconductivity [μS/cm] |
|---|---|---|---|---|---|---|---|
| Example 2 | 0.126 | 0.252 | 2 | 0.1 | 80 | 120 | 1300 |
| Example 3 | 0.126 | 0.63 | 5 | 0.2 | 60 | 140 | 650 |
| Example 4 | 0.09 | 0.27 | 3 | 0.15 | 70 | 130 | 1000 |
| Example 5 | 0.09 | 0.46 | 5 | 0.2 | 60 | 140 | 600 |

The target process level can be performed promptly as shown in Table 1, while the electroconductivity of the fluid 1a before processing is 4000 μS/cm. Particularly, in this case, since the solid content of dispersion liquid of the collected fine particles does not decrease in the same manner as in Example 1, the postprocess can be performed efficiently.

EXAMPLE 6

(Preparation of Hydroxy Gallium Phthalocyanine Pigment Dispersed Liquid)

Synthesis of I Type Chloro Gallium Phthalocyanine Pigment 3-diiminoisoindoline of 30 parts and gallium trichloride of 9.1 parts are stirred and reacted in dimethyl sulfoxide of 230 parts at 160° C. for 6 hours to obtain red purple crystals. Next, the red purple crystals are processed by the ion-exchanged water after being processed by dimethyl sulfoxide and dried to obtain the coarse crystal of 28 parts made of I type chloro gallium phthalocyanine.

Preparation of Hydroxy Gallium Phthalocyanine Pigment Dispersed Liquid

The I type chloro gallium phthalocyanine crystal of 20 parts obtained is dissolved in a 98% concentrated sulfuric acid of 800 parts in an ice bath, while being stirred for 2 hours to prepare a pigment solution (chloro gallium phthalocyanine concentration: 2.4% by mass). The pigment solution is dropped in the mixture solution of 25% ammonia water of 1500 parts and distilled water of 500 parts for 14 hours, and the hydroxy gallium phthalocyanine crystal is deposited. In the process, the pigment solution is dropped while the mixture solution is constantly stirred mechanically. The liquid temperature of the mixture solution at the time of starting the dropping is −3° C. The temperature of the solution while dropping is below 2° C., and the temperature at the time of ending is 1° C.

When the volume average particle diameter of the pigment fine particles in the pigment dispersed liquid obtained is measured by the laser diffraction scattering particle size distribution measuring apparatus (trade name: LA-700, manufactured by Horiba, Ltd.), the volume average particle diameter is 0.05 μm, and the BET specific surface area is 102.6 m$^2$/g.

(Processing of Fine Particles)

The obtained liquid containing the pigment fine particle (solid content: 10% by volume) is made to the first fluid, and the distilled water is made to the second fluid. Thereby the pigment fine particle is processed in the same manner as in Example 1.

At this time, as shown in FIG. 5, two micro reactors 3 shown in FIG. 1 are connected in series, and the flow passage L6 of a device 7 is connected to the flow passage L4 of a device 6. The distilled water having no diffusible substance is supplied to the passages L2, L7 of the micro reactor 3, 5, and the fine particles are processed by the micro reactor 3 and the micro reactor 5 under the same condition.

At this time, the micro reactors 3, 5 are heated by a heater and kept at about 70° C. At this time, the flow rate of the fluid 1a is 0.01 ml/hr, and the flow rate of the fluids 2a, 3a is 0.19 ml/hr. As a result, the flow rate of the fluid 1a1 becomes 0.1 ml/hr, and the flow rate of the fluid 1a2 becomes 0.15 ml/hr. Two laminar flows are similarly generated in the flow passages L3, L10. At this time, the liquid feed speeds of the laminar flows in the passages L3, L10 are respectively about 800 mm/sec, and about 1200 mm/sec by the calculation.

After the fine particles contained in the fluid 1a are repeatedly processed by the micro reactors 3, 5 in the state, the fluid 1a2 containing the fine particles processed is continuously collected from the passage L8. There is neither leak nor loss of fine particles at this time.

When the fine particles are filtered and separated from the obtained fluid 1a2 containing the fine particles, and the electroconductivity of the filtrate which is an index of the staining of the fine particles is examined, the fluid 1a before being processed has electroconductivity of about 3500 μS/cm, and the fluid 1a2 after processed has electroconductivity of about 50 μS/cm. The targeted processed pigment dispersed liquid is obtained. In this case, the acid and the alkali ion materials correspond to the diffusible substance.

EXAMPLE 7

Preparation of a Toner Particle Dispersed Liquid

A fine resin particle dispersed liquid 1, a fine resin particle dispersed liquid 2, a releasing agent fine particle dispersed liquid, and a pigment dispersed liquid are produced in advance by the following method.

| Preparation of a fine resin particle dispersed liquid 1 | |
|---|---|
| styrene | 370 parts |
| n-butyl acrylate | 30 parts |
| acrylic acid | 6 parts |
| dodecanthiol | 24 parts |
| carbon tetrabromide | 4 parts |

A solution containing each component, and a solution obtained by dissolved a nonionic surfactant (trade name: Nonipol 400, manufactured by Sanyo Chemical Industries, Ltd.) of 6 parts, and an anionic surfactant (trade name: Neogen R, manufactured by Dai-ichi Kogyo Seiyaku Co., Ltd.) of 10 parts in ion-exchanged water of 550 parts are dispersed and emulsified in a flask. Ion-exchanged water of 50 parts in which ammonium persulfate of 4 parts is dissolved is put in the flask while the resultant solution is slowly mixed and stirred for 10 minutes. Afterwards, the flask is sufficiently filled with nitrogen, and the flask is heated in an oil bath so that the inside of the system is set to 70° C., and the emulsion polymerization is continued for 5 hours.

The volume average particle diameter of the fine resin particles of the latex obtained is measured by a laser diffraction scattering particle size distribution measuring apparatus (trade name: LA-700, manufactured by Horiba, Ltd.), and the volume average particle diameter is 160 nm. The weight average molecular weight (polystyrene conversion) is measured by a molecular weight measuring instrument (trade name: HLC-8020, manufactured by Tosoh Corporation), and THF is used as a solvent. The weight average molecular weight is 13200.

| Preparation of a fine resin particle dispersed liquid 2 | |
|---|---|
| styrene | 280 parts |
| n-butyl acrylate | 120 parts |
| acrylic acid | 8 parts |

A solution containing each component, and a solution obtained by dissolved nonionic surfactant (trade name: Nonipol 400, manufactured by Sanyo Chemical Industries, Ltd.) of 6 parts, and anionic surfactant (trade name: Neogen R, manufactured by Dai-ichi Kogyo Seiyaku Co., Ltd.) of 12 parts in ion-exchanged: water of 550 parts are dispersed and emulsified in a flask. Ion-exchanged water of 50 parts in which ammonium persulfate of 3 parts is dissolved is put in the flask while the resultant solution is slowly mixed and stirred for 10 minutes. Afterwards, the flask is sufficiently filled with nitrogen, and the flask is heated in an oil bath so that the inside of the system is set to 70° C., and the emulsion polymerization is continued for 5 hours.

The various characteristics of the latex obtained are measured in the same manner as the fine resin particle dispersed liquid 1. The volume average particle diameter of the fine resin particles is 100 nm, and the weight average molecular weight is 540000.

| Releasing agent fine particle dispersed liquid | |
|---|---|
| paraffin was (trade name: HNPO190, manufactured by Nippon Seiro Co., Ltd., melting point: 85° C.) | 50 parts |
| cation surface-active agent (trade name: Sanisol B50, manufactured by Kao Corporation) | 5 parts |
| ion-exchanged water | 200 parts |

The components are mixed, and the components are dispersed while the components are heated at 95° C. by a homogenizer (trade name: Ultratalax T50 manufactured by IKA Corporation). The components are moved to a pressure exhalation type homogenizer, and the dispersing process is performed. Thereby a releasing agent fine particle dispersed liquid of which the volume average particle diameter of the releasing agent fine particle is 540 nm is obtained.

| Preparation of a pigment dispersed liquid | |
|---|---|
| carbon black (trade name: Mogal L, manufactured by Cabot Corporation) | 50 parts |
| nonionic surfactant (trade name: Nonipol 400, manufactured by Sanyo Chemical Industries, Ltd.) | 5 parts |
| ion-exchanged water | 200 parts |

The components are mixed, and the components are dispersed by a homogenizer, (trade name: Ultratalax T50 manufactured by IKA Corporation) for 10 minutes. Thereby a pigment dispersed liquid in which carbon black having a volume average particle diameter of 255 nm is dispersed is obtained.

| Preparation of an aggregated particle (toner particle) dispersed liquid | |
|---|---|
| fine resin particle dispersed liquid 1 | 120 parts |
| fine resin particle dispersed liquid 2 | 80 parts |
| releasing agent fine particle dispersed liquid | 40 parts |
| pigment dispersed liquid | 30 parts |
| cation surface-active agent (trade name: Sanisol B50, manufactured by Kao Corporation) | 1.5 parts |

The components are put in a circular stainless flask, and are sufficiently mixed and dispersed by a homogenizer, (trade name: Ultratalax T50 manufactured by IKA Corporation). The flask is heated at 48° C. while the flask is stirred in an oil bath for heating, and the oil bath for heating is maintained at 48° C. for 30 minutes. In addition, an oil bath for heating is heated at 50° C. for 1 hour, and the aggregated particles are obtained. When the volume average particle diameter of the aggregated particles is measured by a Coulter counter (trade name: TAII, manufactured by Nikkaki Bios Co., Ltd.), the volume average particle diameter is 5.8 µm, and volume average particle size distribution (GSD) is 1.24.

An anionic surfactant (trade name: Neogen R, manufactured by Dai-ichi Kogyo Seiyaku Co., Ltd.) of 3 parts is added to the dispersion liquid of aggregated particles, and the aggregation of the particles is stopped and the aggregated particles are stabilized. The stainless flask is then sealed, and the liquid is heated to 97° C. while the liquid is stirred by using a magnetic seal. The liquid is heated for 3 hours, and thereby the aggregated particles are coalesced. When the volume average particle diameter of the coalesced particles is measured by a Coulter counter (trade name: TAII, manufactured by Nikkaki Bios Co., Ltd.), the volume average particle diameter is 6.3 µm, and volume average particle size distribution (GSD) is 1.24.

(Processing of Fine Particles)

The liquid (solid: 15% by volume) containing the obtained aggregated particle (toner particle) is made to the first fluid, and the distilled water is made to the second fluid. Thereby the aggregated particles are processed in the same manner as in Example 2 except for using a device in which five micro reactors are connected.

When the fine particles are filtered and separated from the obtained fluid containing the fine particles, and the electroconductivity of the filtrate which is an index of the staining of the fine particles is examined, the fluid 1a before being processed has electroconductivity of about 3000 µS/cm, and the fluid 1a2 after being processed has electroconductivity of about 5 µS/cm. The dispersion liquid of aggregated particles processed can be obtained. There is neither leak nor loss of fine particles at this time. In this case, the surface-active agent corresponds to the diffusible substance.

(Toner Characteristics Evaluation)

Hydrophobic titania (trade name: T805, manufactured by Nippon Aerosil Co., Ltd., average particle diameter: 0.021 µm) of 2 parts and hydrophobic silica (trade name: RX50, manufactured by Nippon Aerosil Co., Ltd., average particle diameter: 0.040 µm) of 10 parts are externally added to the aggregated particles (toner particle) of 100 parts, and the mixture is mixed by a Henschel mixer to obtain the toner.

The toner and the silicone resin coat ferrite carrier (volume average particle diameter: 50 µm) are mixed to produce a developer having the toner concentration of 7% by weight. The electrification of the toner is evaluated as follows by using the developer.

After the developer is stirred and mixed by a turbula blender for 25 seconds, the developer is measured by a blow-off electrification measuring device (trade name: TB-500, manufactured by Toshiba Chemical Corporation). The amount of electrification is about −40 µC/g, and sufficient electrification is shown.

As described above, it is understood that the aggregated particles processed by a similar device to the device shown in FIG. 2 have satisfactory properties as a toner for developing an electrostatic charge image.

COMPARATIVE EXAMPLE 1

The fine particles are processed using a nutsche and a filtration bottle in place of the micro reactor as the device in the processing of the fine particles of Example 1.

Specifically, a predetermined filter paper is set on the nutsche, and the liquid containing the fine particles of 20% by volume same as that of Example 1 is put on the nutsche. The filtration bottle is decompressed by an evaporator, and the liquid is filtered. It is confirmed that some fine particles passing through the filter paper are contained in the filtrate. After moisture is removed sufficiently, the fine particles on the filter paper is showered by the ion-exchanged water of ½ amount of the fine particle-containing liquid. After moisture is sufficiently removed, the fine particles on the filter paper are taken out. The fine particles are put again in the ion-exchanged water of the same amount as the amount of an initial liquid containing the fine particles. The solution is stirred, and subjected to dispersion mixing. At this time, some fine particles remain on the filter paper, but all the fine particles cannot be collected. Since fine particle aggregates are observed in the fine particle redispersed liquid, the liquid is further stirred by an agitator in which stirring vanes are attached to a three one motor, and the aggregates of the fine particles are dissolved.

The liquid is filtered by the nutsche again, and the liquid is separated into the fine particles and the filtrate. At this time, electroconductivity of the filtrate is 500 µS/cm. Since the

19 filtration is of a batch type, considerable loss of fine particles is caused. Since the process is complex, the filtration becomes inefficient.

COMPARATIVE EXAMPLE 2

A dispersed liquid of the hydroxy gallium phthalocyanine crystal is prepared in the same manner as the preparation of the pigment dispersed liquid in Example 6, and the crystal deposited is processed by using a centrifugal separator. That is, the pigments cannot be sufficiently separated, and a large amount of pigments may leak to the filtrate in a usual filter paper separation by the filter paper using the nutsche since the particle diameter of the pigments in the dispersed liquid is small. It is difficult to take out pigments adhering to the filter paper. Therefore, a method by solid-liquid separation and removing the supernatant by the centrifuge using the specific gravity difference of pigments is used.

Specifically, the pigment dispersed liquid of 300 ml is put into a centrifugal separator having a capacity of 500 ml, and the pigment dispersed liquid is centrifuged for 10 minutes at 9000 rpm. The cycle is repeated so that the electroconductivity of the supernatant liquid after centrifugation is less than 20 µS/cm, and thereby a pigment fine particle dispersed liquid is obtained. However, in this methods a long period of time is required for centrifugation, and removal of solid from a sample bottle for a centrifugal separator is complex. In addition, since the solid becomes considerably hard pigment aggregates, dispersion of the solid is difficult and very inefficient. The pigment dispersed liquid is heated to about 70° C. by a mantle heater before centrifugation, and heating is repeated every time. Therefore, a long period of time is required, and operation efficiency worsens.

COMPARATIVE EXAMPLE 3

A dispersion liquid of aggregated particles is obtained in the same manner as the preparation of the dispersion liquid of aggregated particles in Example 7. The aggregated particles in the dispersion liquid of aggregated particles are processed, not by the micro reactor, but by the batch type method using the same nutsche as in Comparative Example 1.

Specifically, the dispersion liquid of aggregated particles is put into the nutsche in which the filter paper is set, and the batch type processing in which suck filtration is performed by the filtration bottle is processed seven times by using distilled water. Therefore, a dispersion liquid of fine particles of which the desired electroconductivity is 5 µS/cm can be obtained. However, about 5% of the fine particles leak The re-dispersion of the pigment aggregates requires much time, and operation efficiency deteriorates drastically.

According to the invention, the fine particles can be continuously processed, and operating efficiency is excellent. There is neither leak nor loss of the fine particles. In addition, heating can be done promptly, and loss of energy is a very minimal.

What is claimed is:

1. A method for treating fine particles associated with diffusible substances comprising dispersants, stabilizers, processing agents or surfactants, contained in a first fluid comprising:

forming the fine particles, the diffusible substance being introduced when forming the fine particles;

feeding the first fluid containing the fine particles and a second fluid to generate two laminar flows that flow in substantially a same direction;

migrating the diffusible substance contained in the first fluid into the second fluid at an interface between the first fluid and the second fluid in the laminar flows; and separating the laminar flows into the first fluid containing the fine particles and the second fluid in a diverging region;

wherein the first fluid and the second fluid are heated to a substantially same temperature for the migrating; and wherein the fine particles are polymer fine particles.

2. The method of claim 1, wherein the feeding of the first fluid containing the fine particles and the second fluid to generate the two laminar flows, the migrating of the diffusible substance contained in the first fluid into the second fluid, and the separating of the laminar flows into the first fluid containing the fine particles and the second fluid are repeated a plurality of times to reduce the diffusible substance contained in the first fluid sequentially.

3. The method of claim 2, wherein a liquid feed flow rate of the second fluid is equal to or more than the liquid feed flow rate of the first fluid containing the fine particles.

4. The method of claim 3, wherein a flow passage width of the first fluid becomes narrower than the flow passage width of the second fluid in the two laminar flows as a ratio of the liquid feed flow rate of the second fluid to the liquid feed flow rate of the first fluid is increased.

5. The method of claim 1, wherein a liquid feed flow rate of the second fluid is equal to or more than the liquid feed flow rate of the first fluid containing the fine particles.

6. The method of claim 5, wherein a flow passage width of the first fluid becomes narrower than the flow passage width of the second fluid in the two laminar flows as a ratio of the liquid feed flow rate of the second fluid to the liquid feed flow rate of the first fluid is increased.

7. The method of claim 5, wherein a diverging point of the first fluid and the second fluid in the diverging region exists on a liquid feed direction line moved to the first fluid side, in the ratio X to the flow passage width represented by the following formula (1), from the center of the flow passage width of the two laminar flows when a ratio of the liquid feed flow rate of the second fluid to the liquid feed flow rate of the first fluid is N;

$$X = 0.164 \times \ln N + E \quad \text{Formula (1)}$$

wherein N is a real number of 1 to 20, and E indicates an error range of 0 to −0.1.

8. The method of claim 1, wherein a volume average particle diameter of the fine particles contained in the first fluid is within a range of about 0.1 to about 1000 µm.

9. The method of claim 1, wherein a particle size distribution of the fine particles contained in the first fluid is within a range of about 1 to about 3 in GSD, where GSD is obtained by the cumulative distribution of the particle sizes measured in diameters and volume accumulation of particle sizes.

10. The method of claim 1, wherein a true specific gravity of the fine particles contained in the first fluid is within a range of about 0.5 to about 5.0.

11. The method of claim 1, wherein a solid content of the fine particles contained in the first fluid is within a range of about 1 to about 60% by volume.

12. The method of claim 1, wherein a mass of the diffusible substance contained in the second fluid is ½ or less than that of the diffusible substance contained in the first fluid.

13. The method of claim 1, wherein a liquid feed speed $V_1$ of the first fluid $1a$ and the liquid feed speed $V_2$ of the second fluid $2a$ are within a range of about 0.01 to about 50 ml/hr.

14. The method of claim 1, wherein a ratio N ($V_2/V_1$) of a liquid feed speed $V_2$ of the second fluid 2a to a liquid feed speed $V_1$ of the first fluid 1a is within a range of about 1.0 to about 50.

15. The method of claim 1, wherein the second fluid has no diffusible substance when feeding the first fluid containing the fine particles and the second fluid to generate two laminar flows.

16. The method of claim 1, wherein the diffusible substances are an ionic substance or a substance that can be dissolved in a solvent.

17. The method of claim 1, wherein the diffusible substances are a dispersant processing agent or surfactant that is introduced when forming the fine particles.

* * * * *